United States Patent [19]

Chase et al.

[11] Patent Number: 5,623,391
[45] Date of Patent: Apr. 22, 1997

[54] SPEAKER COVER AND SNAP-IN COUPLING THEREFOR

[75] Inventors: Steven B. Chase, Cupertino; James K. Levins, Santa Clara, both of Calif.

[73] Assignee: Apple Computer, Inc., Cupertino, Calif.

[21] Appl. No.: 415,466

[22] Filed: Apr. 3, 1995

[51] Int. Cl.⁶ ............................... G06F 1/16; H05K 5/00
[52] U.S. Cl. ........................ 361/681; 361/683; 248/917; 312/7.2
[58] Field of Search ........................... 361/679, 681–683; 248/917, 918; 312/7.2, 8.16, 223.1–223.3; 348/787–794, 825–844; 181/199

[56] References Cited

U.S. PATENT DOCUMENTS 3,240,876  3/1966  Whitney ................................. 348/836
4,032,725  6/1977  McGee ................................... 381/205

Primary Examiner—Leo P. Picard
Assistant Examiner—Jayprakash N. Gandhi
Attorney, Agent, or Firm—Burns, Doane, Swecker & Mathis, L.L.P.

[57] ABSTRACT

A personal computer includes an outer housing, including a front bezel to which frames a monitor screen of the computer. Speakers are mounted to the back of the bezel, and apertured speaker covers are disposed in front of the speakers. The speaker covers are of smaller size than the bezel, and are non-releasably mounted to the bezel by tamper-resistant snap-in couplings.

15 Claims, 4 Drawing Sheets

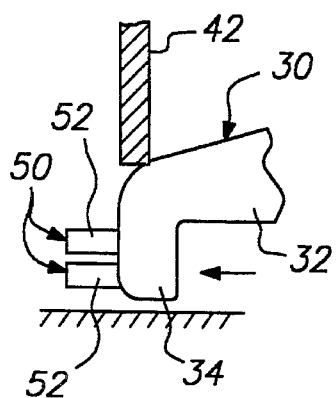
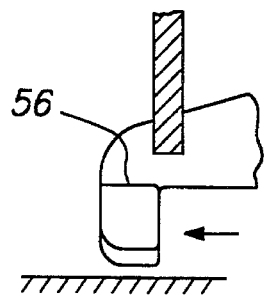
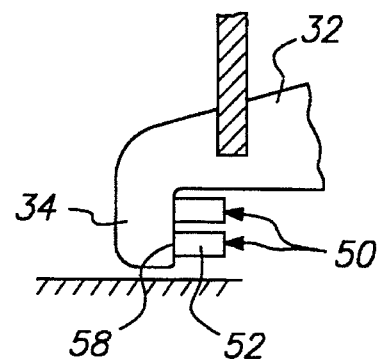
FIG. 8A        FIG. 8B        FIG. 8C
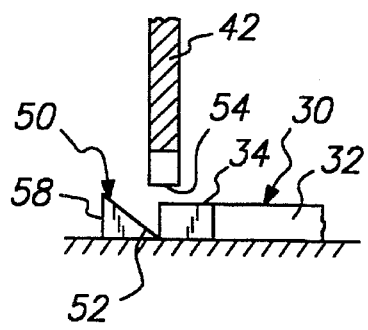
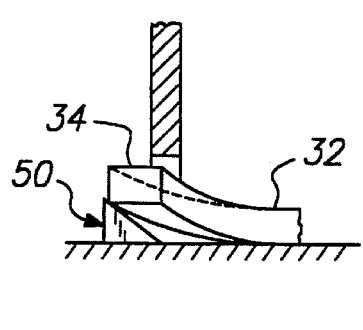
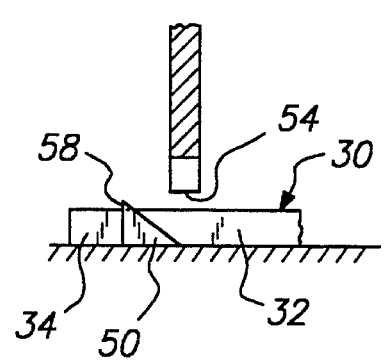
FIG. 9A        FIG. 9B        FIG. 9C

SPEAKER COVER AND SNAP-IN COUPLING THEREFOR

BACKGROUND OF THE INVENTION

The present invention relates to appliances having speakers mounted on a housing, and in particular to speaker covers for covering the speakers. The invention also relates to snap-in couplings for the mounting of members, such as speaker covers.

Certain appliances, such as computers, televisions, etc., include speakers mounted to a housing of the appliance. For example, a personal computer typically comprises a metal chassis on which the operational equipment for the computer is mounted. An outer housing, which can be formed of plastic, encompasses the chassis. The outer housing includes front and rear sections, the front portion being in the form of a rectangular bezel which frames the monitor screen of the computer.

Typically, the computer is provided with speakers situated behind the bezel, and the bezel is provided with tiny apertures to emit sound from the speakers. The bezel is normally formed by a molding operation, wherein pins are mounted in the mold to function as cores in the forming of the sound-emitting apertures. The pins are very thin in comparison to the size of the bezel-forming mold cavity, and it is not uncommon for the pins to break in response to the high pressures applied thereto, including the relatively large pressures applied by the molten molding material. Therefore, it would be desirable to enable speakers to be covered by a structure having tiny sound-emitting apertures and yet which can be manufactured more reliably, and which is durable and forms a permanent part of the housing.

SUMMARY OF THE INVENTION

One aspect of the present invention relates to an appliance, such as a personal computer which includes a chassis encompassed by an outer housing. The housing includes a section occupying a side of the chassis. A speaker is mounted behind that housing section, and an apertured speaker cover lies in front of the speaker. The speaker cover constitutes a separate member from the housing section and is connected thereto.

The housing section to which the speaker cover is connected preferably comprises a bezel which extends around a monitor screen of the computer.

The speaker cover is preferably non-releasably connected to the housing section by means of a snap-in coupling.

In another aspect of the invention, there is provided a snap-in coupling for establishing a non-releasable connection of a first element (such as a speaker cover) to a second element (such as a computer housing). The first element includes a body and a flexible snap arm projecting from the body. The snap arm includes a main portion joined to the body, and a lateral projection disposed at a free end of the main portion. The second member includes a slot for receiving the snap arm. The slot includes a constraining surface, a bending surface, and a locking surface. The constraining surface constrains the main portion of the snap arm against bending. The bending surface elastically bends the lateral projection relative to the main portion about an axis extending along the main portion. The locking surface is situated at an end of the bending surface. The lateral projection snaps behind the locking surface upon traveling off the bending surface, in order to oppose removal of the first element from the second element.

Preferably, the slot includes a narrow section for receiving the main portion of the snap arm, and a wide section for receiving the lateral projection. The narrow section possesses the constraining surface, and the wide section possesses the bending surface.

The body and snap arm are preferably formed in one piece from a plastic material.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIGS. 8A, 8B and 8C are sectional views taken along the line 8—8 in FIG. 6 depicting various stages of insertion of the snap arm; and FIGS. 9A, 9B, and 9C are sectional views taken along the line 9—9 in FIG. 6 depicting various stages of insertion of the snap arm, corresponding to FIGS. 8A, 8B and 8C, respectively.

DESCRIPTION OF A PREFERRED EMBODIMENT OF THE INVENTION

Figure 1:
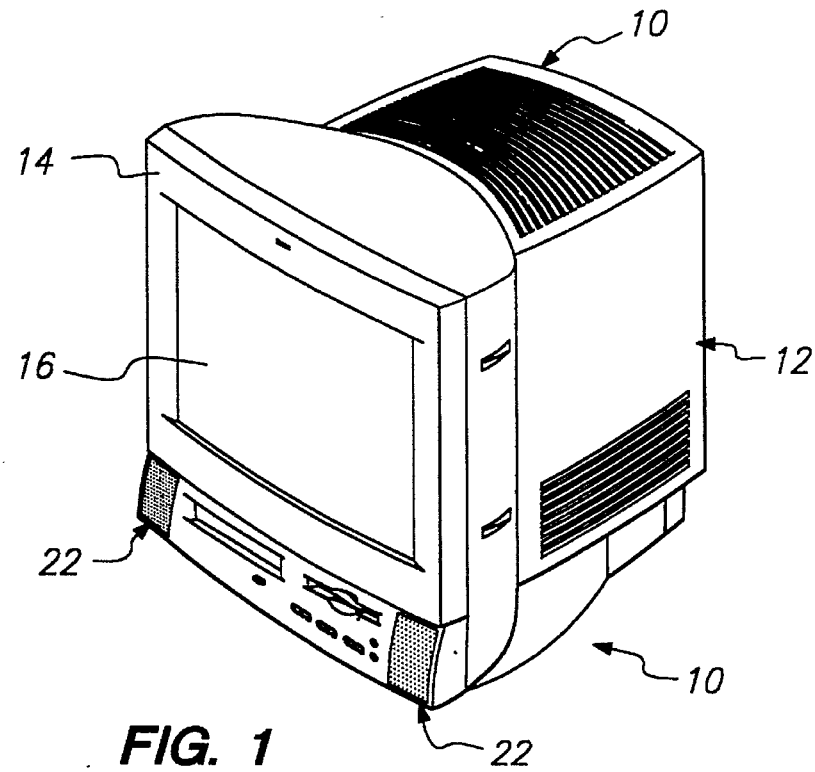
FIG. 1 is a front perspective view of a personal computer embodying speaker covers according to the present invention.
Figure 2:
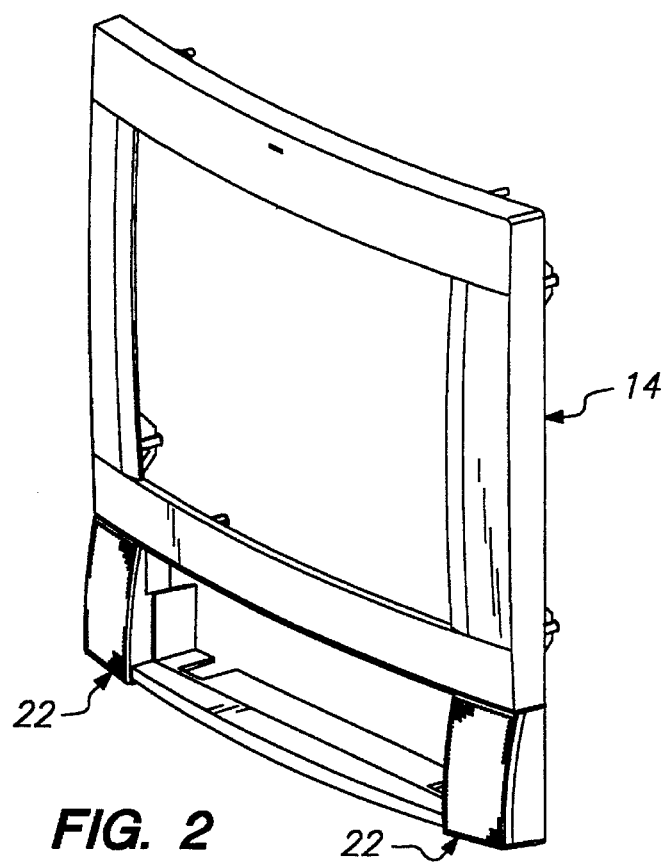
FIG. 2 is a front perspective view of a bezel portion of an outer housing of the computer, with the speaker covers installed.

Depicted in FIG. 1 is a personal computer 10 which includes an outer housing comprised of a rear section 12, and a front section 14 in the form of a rectangular bezel which frames a monitor screen 16. The bezel 14 includes two large openings 18 to the back of which are mounted speaker elements 20.

Figure 3:
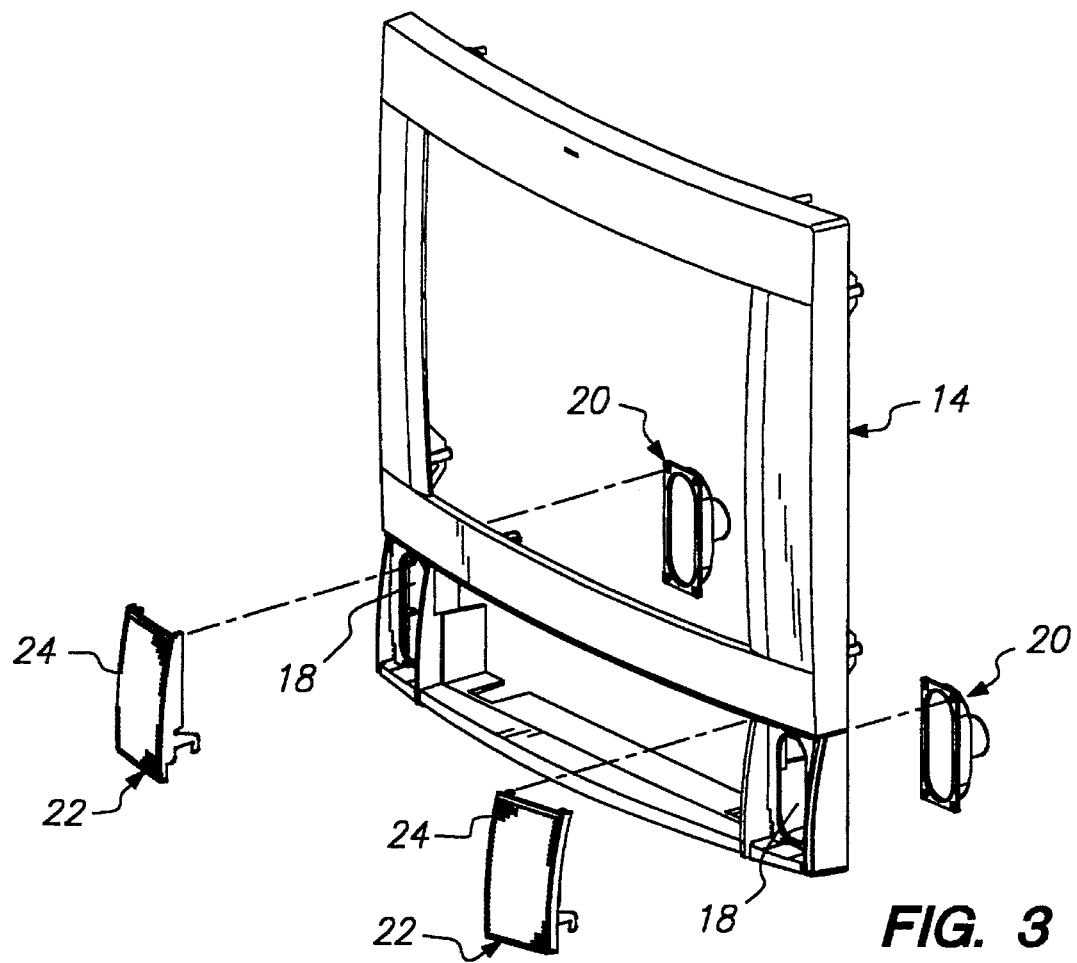
FIG. 3 is an exploded view of FIG. 2.
Figure 4:
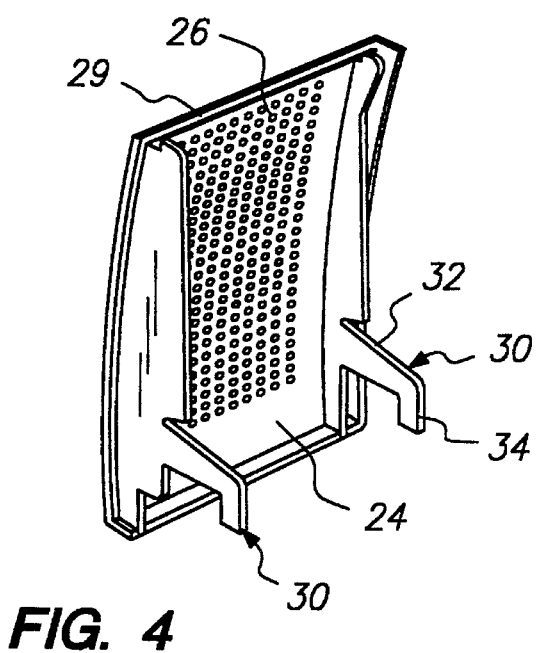
FIG. 4 is a rear perspective view of a speaker cover according to the present invention.

In accordance with the present invention, separate speaker covers 22 are provided (see FIG. 3) which are mounted to the bezel 14 and which contain tiny sound-emitting apertures 26 (see FIG. 4).

By forming the tiny apertures in relatively small speaker covers 22, rather than in the bezel 14 (as has been conventional), the tiny apertures can be formed more reliably. That is because the pressures imposed on the core pins used to form the tiny apertures during the molding of the relatively small covers 22 are substantially less than the pressures imposed during the molding of the relatively large bezel 14. Thus, there is less of a tendency for those pins to break.

The provision of speaker covers 22 which are separate from the bezel gives rise to the need to oppose attempts to remove such covers, especially by children.

Accordingly, the present invention also envisions a permanent (tamper-resistant) mounting of the speaker covers 22. Such a mounting, however, must be easy to accomplish in order to simplify the overall assembling of the computer.

Figure 5:
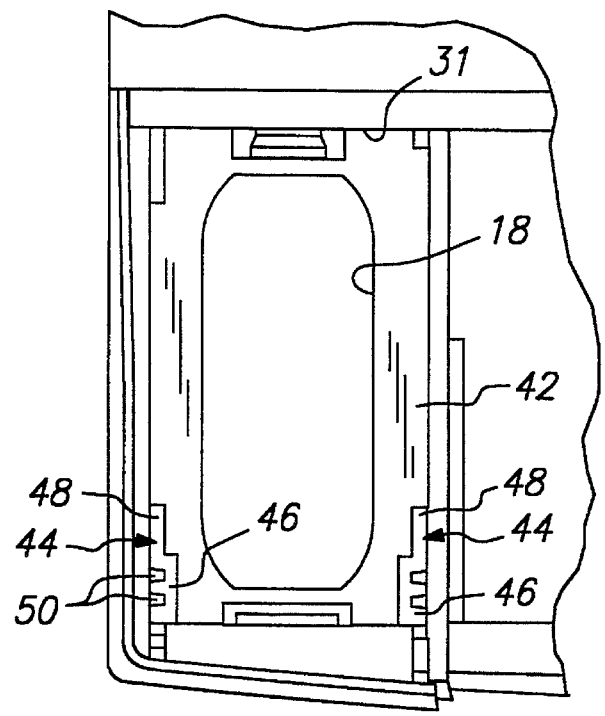
FIG. 5 is a front elevational view of a section of the bezel, with the speaker cover omitted.

The right and left speaker covers 22 are virtually identical, although being mirror images of one another. The left side speaker cover 22 is depicted in detail in FIG. 4. That cover 22, which is molded in one-piece of a plastic material, includes a body 24 through which an array of tiny apertures 26 extends. Disposed along a top edge of the body 24 is a recess 29 which receives a top edge 31 of a receiver portion of the bezel 14 (see FIG. 5).

Projecting rearwardly from opposite vertical sides of a rear surface of the body 24 are two identical hook-shaped snap arms 30. Each snap arm 30 comprises a main portion 32 joined integrally with the body 24, and a lateral projection 34 disposed at a free end of the main portion.

The receiver portions of the bezel which receive the speaker covers 22 are of similar construction, and, like the speaker covers themselves, are mirror images of one another. The left side receiver portions, depicted in FIG. 5, includes one of the openings 18, which is formed in a partition wall 42. Also formed in the partition wall are two slots 44 for receiving respective snap arms 30, each slot 44 including a wide section 46 and a narrow section 48.

Disposed on the partition wall 42 and extending into the wide section of each slot are two ramps 50. As will be explained in detail hereinafter, when the snap arms 30 are inserted through the slots 44, the lateral projection 34 of each arm 30 slides up along the ramps 50 and becomes torqued relative to the main section 32, because the main portion 32 is constrained against torquing by the narrow portion 48 of the slot 44. In other words, the lateral projection 34 bends relative to the main portion 32 about an axis 56 extending along the main portion. Once the torqued projection 34 travels past the ramps 50, it snaps back to a position behind the ramp to retain the cover 22 in place. As long as the projections 34 remain intact, removal of the cover 22 is effectively resisted, because there is no way to reverse-torque the projections 34 unless the bezel is removed.

Figure 6:
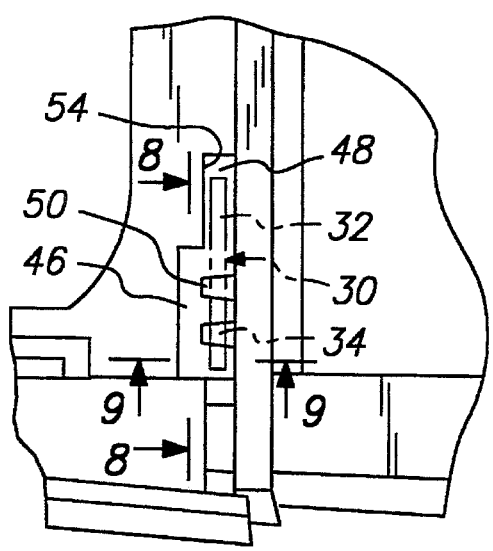
FIG. 6 is an enlarged fragmentary view of FIG. 5, depicting in solid lines a slot for receiving a snap arm of the speaker cover, and with the snap arm depicted by broken lines in a position at either the beginning or end of its insertion into the slot.
Figure 7:
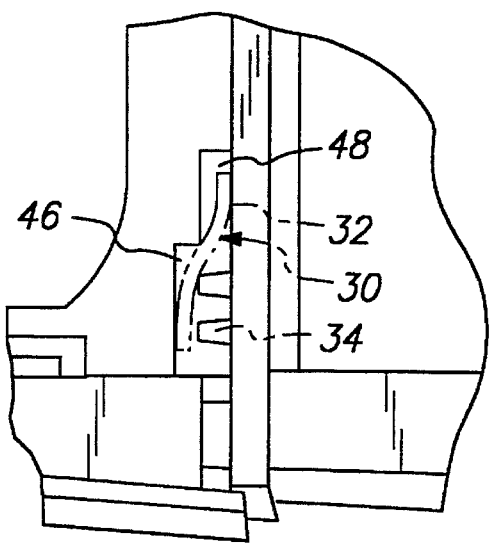
FIG. 7 is a view similar to FIG. 6 depicting the snap arm in an intermediate position during insertion into the slot.

The behavior of the snap arms 30 during installation of the cover is shown in FIGS. 8A–C and 9A–C. As the cover is being installed, each snap arm 30 is situated as shown in broken lines in FIG. 6 wherein the projection 34 is aligned with the wide section 46 of the slot 44, and the main portion 32 is aligned with the narrow section 48. Initially, the projection of each arm 30 abuts bases of the ramps 50 as shown in FIGS. 8A and 9A. Upon further travel into the slot, the projection 34 moves along inclined faces or bending faces 52 of the ramps 50 (see FIGS. 8B, 9B). During that travel, the main portion 32 of each snap arm is disposed within the narrow section 48 of the slot, whereby its extent of lateral movement, i.e., movement in a direction perpendicular to the inward travel of the snap arm is constrained by a constraining surface 54 forming one side of the narrow section 48 of the slot. Hence, the lateral projection 34 bends relative to the main portion 32 about an axis 56 extending along the main portion 32, while that main portion is being constrained against bending, by the surface 54 (see FIGS. 8B, 9B).

After the projection 34 of each snap arm 30 travels past the associated bending surfaces 52, it snaps back to a position behind a non-inclined locking surface 58 formed by an end of each ramp 50. Hence, any attempt to remove the speaker cover 22 from the bezel 14 will be prevented by the engagement of the projections 34 with the locking surfaces 58 of the ramps 50 as shown in FIGS. 8C and 9C.

It will be appreciated that in order to remove the cover 22 from the bezel, the projections 34 must be reverse-torqued to a position out of the way of the locking surfaces 58. Since that cannot be done while the bezel 18 remains coupled to the rear housing section 12, the speaker covers are effectively tamper-resistant.

It will be appreciated that the present invention enables sound-emitting apertures to be formed in an appliance such as a personal computer housing section in a more expeditious and reliable way by forming the tiny sound-emitting apertures in small speaker covers which can be mounted in a larger housing section (e.g., bezel). As such, there is less risk of the core pins which form the tiny apertures during a molding procedure being broken during that procedure.

Also, a snap-in coupling is provided which is of simple construction, but which effectively establishes a non-releasable (tamper-resistant) coupling for a member such as a speaker cover.

The invention is applicable to various types of appliances in which a speaker is to be mounted on a housing, such as televisions, and is not limited to computers.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. An appliance including a chassis encompassed by an outer housing, said housing including a section occupying a side of said chassis, a speaker mounted behind said housing section, and an apertured speaker cover lying in front of said speaker, said speaker cover constituting a separate member from said housing section and being non-releasably connected thereto by a snap-in coupling, said snap-in coupling comprising a flexible snap arm projecting from an apertured body of said speaker cover; said snap arm including a main portion joined to said body, and a lateral projection disposed at a free end of said main portion; said housing section including a slot for receiving said snap arm; said slot including a constraining surface for constraining said main portion against bending, a bending surface for elastically bending said lateral portion relative to said main portion about an axis extending along said main portion, and a locking surface situated at an end of said bending surface and behind which said lateral projection snaps upon traveling off said bending surface, to oppose removal of said speaker cover from said housing section.

2. The appliance according to claim 1 wherein said slot includes a narrow section for receiving said main portion of said snap arm, and a wide section for receiving said lateral projection, said narrow section possessing said constraining surface, and said wide section possessing said bending surface.

3. The appliance according to claim 2 wherein said speaker cover includes two said snap arms, and said housing section includes two said slots for receiving respective snap arms.

4. The appliance according to claim 1 wherein said body and snap arm are formed in one piece from a plastic material.

5. An appliance including a chassis encompassed by an outer housing, said housing including a section occupying a side of said chassis, a speaker mounted behind said housing section, and an apertured speaker cover lying in front of said speaker, said speaker cover constituting a one-piece body separate from said housing section and being connected thereto, said body covering said speaker and having numerous apertures therein and a rear surface facing towards said chassis, at least one elastically bendable snap-arm being of one-piece construction with said rear surface and projecting rearwardly therefrom for non-releasable reception in a slot of said chassis.

6. The appliance according to claim 5 wherein said appliance includes a monitor screen, said housing section comprising a bezel extending around said monitor screen.

7. The appliance according to claim 6 wherein said speaker cover is disposed at a lower corner of said bezel.

8. The appliance according to claim 7 wherein there are two said speaker covers connected to said bezel at respective lower corners thereof.

9. The appliance according to claim 5 which constitutes a personal computer, said chassis carrying a monitor, said housing section comprising a front bezel which frames a screen of said monitor.

10. A snap-in coupling for establishing a non-releasable connection of a first element to a second element; said first element including a body and a flexible snap arm projecting from said body; said snap arm including a main portion joined to said body, and a lateral projection disposed at a free end of said main portion; said second element including a slot for receiving said snap arm; said slot including a constraining surface for constraining said main portion against bending, a bending surface for elastically bending said lateral projection relative to said main portion about an axis extending along said main portion, and a locking surface situated at an end of said bending surface and behind which said lateral projection snaps upon traveling off said bending surface, to oppose removal of said first element from said second element.

11. The snap-in coupling according to claim 10 wherein said slot includes a narrow section for receiving said main portion of said snap arm, and a wide section for receiving said lateral projection, said narrow section possessing said constraining surface, and said wide section possessing said bending surface.

12. The snap-in coupling according to claim 11 wherein said bending surface is formed by a ramp member disposed in said wide section, said ramp also forming said locking surface extending from an end of said bending surface.

13. The snap-in coupling according to claim 11 wherein there are two of said snap arms and two of said slots receiving respective snap arms.

14. The snap-in coupling according to claim 12 wherein said snap arms lie in parallel planes.

15. The snap-in coupling according to claim 10 wherein said body and snap arm are formed in one piece from a plastic material.

* * * * *